Figure 1:
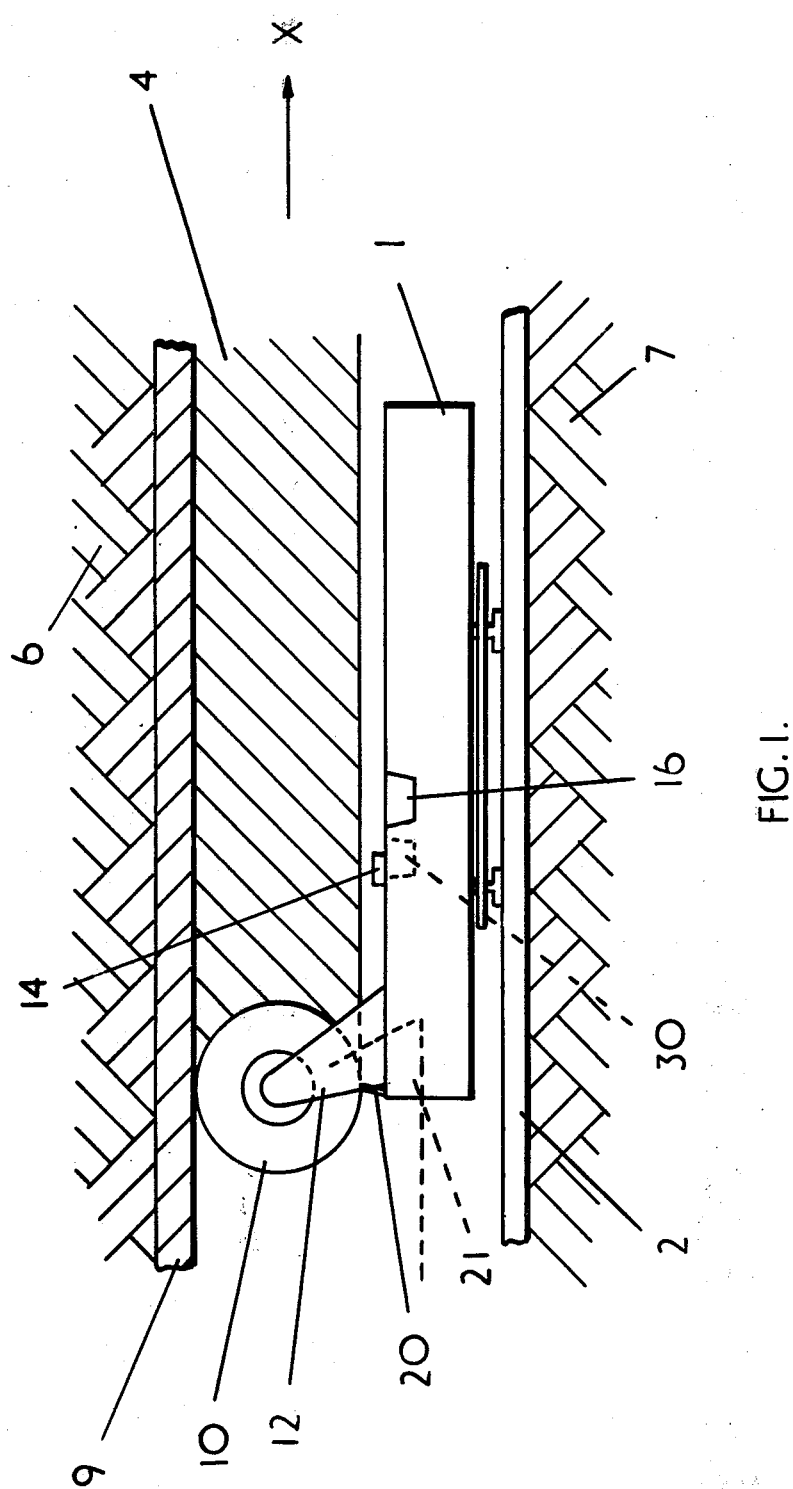

United States Patent [19]
Hartley et al.

[11] 4,155,594
[45] May 22, 1979

[54] METHOD OF AND APPARATUS FOR STEERING A MINING MACHINE

[75] Inventors: Dennis Hartley, Burton-on-Trent; John S. Wykes, Allenton, both of England

[73] Assignee: Coal Industry (Patents) Limited, London, England

[21] Appl. No.: 782,520

[22] Filed: Mar. 30, 1977

[30] Foreign Application Priority Data

Apr. 30, 1976 [GB] United Kingdom ............... 17682/76

[51] Int. Cl.² .................... E21C 27/24; E21C 41/00
[52] U.S. Cl. .................................. 299/1; 250/254
[58] Field of Search .................... 299/1; 250/253, 254; 175/41; 166/253

[56] References Cited

U.S. PATENT DOCUMENTS

| 2,562,929 | 8/1951 | Lord et al. | 250/253 |
| 3,371,964 | 3/1968 | Weber | 299/1 |
| 3,817,578 | 6/1974 | Wilson | 299/1 |

FOREIGN PATENT DOCUMENTS 1093118  6/1966 United Kingdom .................. 299/1

Primary Examiner—Ernest R. Purser
Attorney, Agent, or Firm—James C. Wray

[57] ABSTRACT

A method of steering a mineral mining machine so as to remain in the mineral seam. Natural radiation from rock strata adjacent to the mineral seam is sensed and the machine is steered from the intensity of radiation so that a residual layer of mineral left by the machine which attenuates the radiation has a thickness which is constrained to fall within preselected limits.

13 Claims, 4 Drawing Figures

METHOD OF AND APPARATUS FOR STEERING A MINING MACHINE

This invention relates to a method of and apparatus for steering a mining machine in a mineral seam, such as a coal seam, so that the machine follows a desired direction of travel with respect to the boundary of the seam, and rock from adjacent rock strata is not won with the mineral. It is known to control a cutter drum of the machine, utilising natural radiation arising within the mineral, or radiation from a source on the machine back-scattered by the mineral, the radiation being detected by a sensor attached to the cutter drum or to a first member attaching the cutter drum to the machine or to a second member attached to the machine, the sensor being necessarily adapted to move with respect to the machine to follow the seam boundary.

It is also known to use ultrasonic means for establishing the state of a mine roof, in order that mine roof supports are not placed in cavities in the roof caused by falling rock or coal.

It is an object of the present invention to provide an improved form of control of steering.

According to one aspect of the present invention a method of steering a cutting means of a mineral mining machine relative to a rock boundary of a mineral seam which in use is won by the machine making a series of traverses to and fro along a longwall face, comprises sensing an intensity of natural radiation emitted from the rock and passing through a residual layer of the mineral seam at its boundary with the rock, determining from the intensity the amount of radiation absorbed by the residual layer of the mineral seam and thereby ascertaining the thickness of the said residual layer and steering the machine to maintain the thickness of the residual layer within a preselected range.

Preferably, the thickness of the residual layer of mineral left by the mining machine on a previous traverse along the face is determined, the thickness of the residual layer currently being left by the machine being deduced by sensing the height of the residual layer formed on said previous traverse relative to the height of the residual layer currently being formed.

Conveniently, the height of the residual layer formed on said previous traverse is determined acoustically.

Advantageously, the acoustic determination comprises an ultrasonic signal being directed towards the residual layer.

According to another aspect of the present invention a mining machine adapted for carrying out the above defined method comprises a natural radiation sensor fixedly mounted on the machine and arranged to derive a signal indicative of the thickness of the residual layer of the mineral seam left by the machine on said previous traverse, and means mounted on the machine for comparing the heights of the residual layer formed on said previous and current traverses, respectively, and for deriving signal means indicative of said compared heights.

Preferably, the means comprises acoustic means for sensing the height of the residual layer formed on said previous traverse.

Advantageously, the acoustic means is adapted to direct an ultrasonic signal towards the residual layer of mineral formed on said previous traverses.

Preferably, the means comprises electrical transducer means adapted to sense the height of the residual layer currently being formed.

Conveniently, the cutting means is carried on a rangeable arm, the electrical transducer means being arranged to sense the ranged position of the arm.

Conveniently, in use, the derived signals are fed to control means for the machine's steering mechanism.

Figure 2:
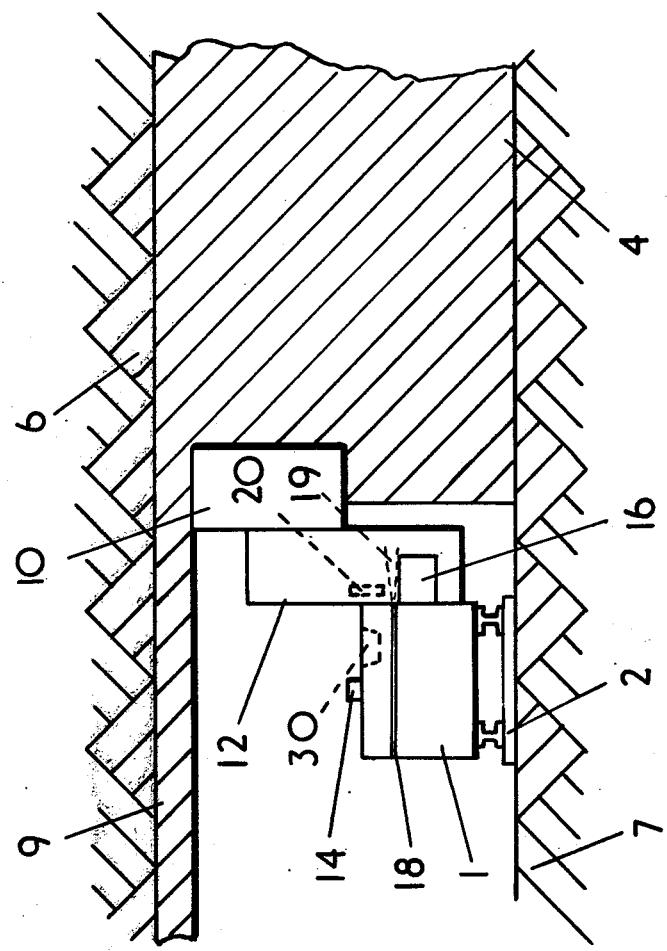
Figure 3:
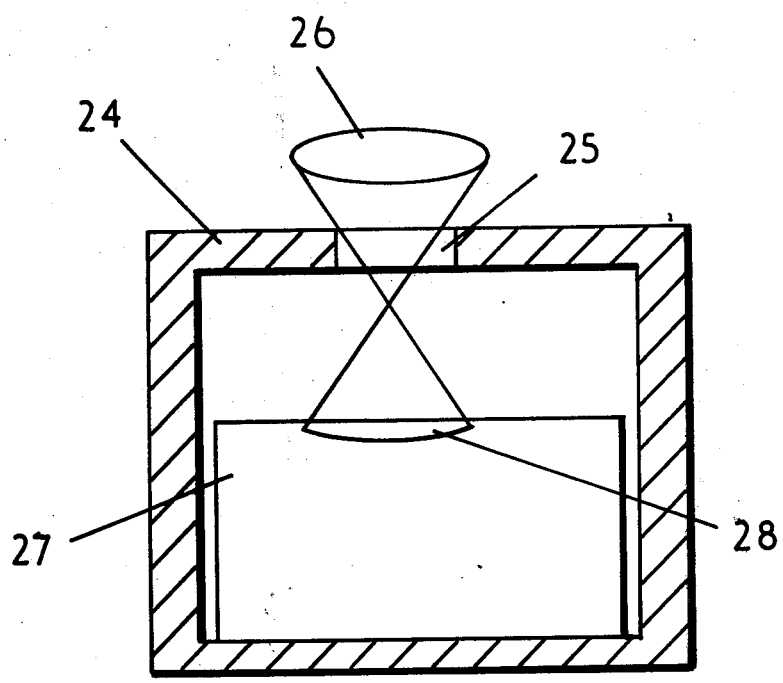
Figure 4:
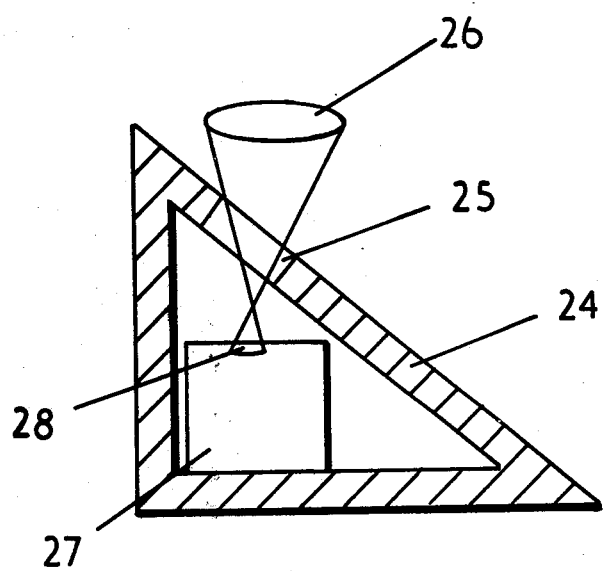

The invention will now be described by way of example only with reference to the accompanying drawings in which:

FIG. 1 is a diagrammatic side view of a coal mining machine equipped with apparatus for performing the present invention, FIG. 2 is a diagrammatic end view of FIG. 1, FIG. 3 shows an enlarged view of apparatus comprising part of FIG. 2, FIG. 4 shows an alternative embodiment of the apparatus of FIG. 3, Referring to FIGS. 1 and 2 a coal mining machine 1 is arranged to travel along an armoured face conveyor 2. The mining machine 1 is moved in a direction indicated by arrow X, in a mineral seam 4 (see FIG. 2) lying between top and bottom rock layers 6, 7 respectively.

A residual mineral layer 9 has been left by a cutter drum 10. The cutter drum 10 is attached to a member 12. The member 12 is pivotally attached to the mining machine 1. Ultrasonic acoustic means 14 are mounted on top of the body of the mining machine 1 for deriving an electrical signal indicative of the distance between the residual mineral layer 9 and the machine 1, the lower boundary of the residual mineral layer 9 being the roof of the mine.

A natural radiation sensor 16 (shown dotted in FIG. 1) is mounted fixedly on to the side of the mining machine 1, in between the mineral to be mined 4 and the machine 1. The natural radiation sensor 16 detects the proportion of gamma radiation emitted from the rock layer 6, which is not absorbed by the residual mineral layer 9. Cleaning equipment 18, in this embodiment a hose for directing a stream of water 19 is mounted on the machine 1, for maintaining the surface of the natural radiation sensor 16 free from coal dust or other material created by operation of cutter drum 10 and thereby to prevent erroneous readings arising from sensing of a false residual layer, that is the coal or other material laying on top of the sensor 16.

A transducer 20 (shown dotted in FIG. 2), is attached to the member 12 and to the machine body 1 to derive an electrical signal, indicative of an angle 21, between the member 12 and the machine body 1.

Referring to FIG. 3, it will be seen that natural radiation sensor 16 comprises a shield 24, substantially impermeable to natural radiation with a window 25, permeable to natural radiation. The shield 24 is movable and defines a position of the window 25 which defines a solid angle 26.

Mounted within the shield 24 is radiation detector 27, comprising one or more scintillation crystals 28 with associated circuitry for deriving an electrical signal dependent upon the intensity of the radiation striking the crystals through window 25. The three electrical signals from the means 14, sensor 16 and transducer 20 are fed to analysis means 30 (shown dotted in FIGS. 1 and 2).

An alternative radiation sensor 16 is shown in FIG. 4, with the window 25 being sloped to encourage dust falling on the window 25 to fall off the radiation sensor 16. The same reference numerals are used on FIG. 4 as on FIG. 3.

In operation, natural radiation from the rock layer 6 passes through mineral layer 9 and an air gap before reaching radiation sensor 16. It will be appreciated some radiation is absorbed by the mineral and only a proportion reaches the air gap and further that only radiation collimated by the geometry of the window 25, that is radiation with a travel path towards the detector within the solid angle 26, will be recorded by crystal 28 or crystals 28, since the substantially impermeable shield 24 prevents stray radiation reaching the crystal or crystals from another direction.

It will also be appreciated that natural radiation, which is substantially all gamma radiation is not attenuated by the air gap to a degree measurable by the radiation sensor.

Consequently, the intensity of radiation reaching the sensor and the dependent magnitude of the signal derived by the associated circuitry of crystals 28 are inversely proportional to the thickness of the residual mineral layer 9.

The ultrasonic acoustic means 14 cause an ultrasonic signal to be derived which rebounds off the residual mineral layer 9 comprising the roof of the mine, the time of travel of the ultrasonic acoustic signal being proportional to the distance travelled by the signal. The ultrasonic acoustic means 14, further causes the electrical signal to be derived, which signal is proportional to the time of travel and consequently to the distance of the layer 9 above the machine 1, that is, proportional to the height of the roof.

It is clear that the signals derived by the sensor 16 and the ultrasonic acoustic means 14 are of historic phase, that is, they are representative of mineral 9 remaining after the cutting operation of the drum 10 of the machine 1, whereas the signal from transducer 20 is of current phase, that is, it is representative of actual cutting performance of the machine 1.

The three electrical signals derived by the radiation detector 16, the ultrasonic acoustic means 14 and the transducer 20 provide sufficient information for the steering of the machine 1.

In operation it is by analysis and comparison of the signals relating to the two phases, i.e. historic and current in the analysis means 30 that the mining machine 1 is steered.

For example, if the thickness of residual layer is detected as too little on the previous traverse, i.e. in the historic phase then the cutter drum is lowered further from the rock boundary by ranging the arm 12. The desired position is determined from the signal from the transducer 20. Alternatively, the sensed residual layer formed on the previous traverse may be too great, in which case the cutter drum is moved closer to the rock boundary. The desired amount of movement is again achieved by utilisation of the electrical signal from the transducer means 20.

The analysis means could comprise logic circuitry in a computer or microprocessor.

Hence it may be seen that the machine follows a desired direction of travel with respect to the boundary of the seam.

The remoteness of the apparatus for carrying out the measurements of the present invention, from the mine roof, means that it can in other embodiments be mounted on different parts of the machine.

Futher embodiments of the invention may comprise the method being applied to mining machines of a form different to that described, the apparatus being suitably mounted on such machines.

The signals could be interfaced to a computer outside the mine, for monitoring and recording purposes instead of or in addition to analysis.

In yet further embodiments of the invention, the analysis means could comprise electrical circuitry for detecting and compensating for unusual input signals, which may occur for example when the mining machine passes a mine roof cavity. The natural radiation detector could in other embodiments be mounted on a member attached to the machine.

From the above description it can be seen that the present invention provides an improved form of control of steering.

What is claimed is:

1. A method of steering a cutting means of a mineral mining machine relative to a rock boundary of a mineral seam, comprising sensing an intensity of natural radiation emitted from the rock and passing through a residual layer of the mineral seam at its boundary with the rock, determining from the intensity the amount of radiation absorbed by the residual layer of the mineral seam and thereby ascertaining the thickness of the said residual layer and steering the cutting means of the machine to maintain the thickness of the residual layer within a preselected range.

2. A method as claimed in claim 1, wherein the thickness of the residual layer of mineral left by the mining machine on a previous traverse along the face is determined, the thickness of the residual layer currently being left by the machine being deduced by sensing the height of the residual layer formed on said previous traverse relative to the height of the residual layer currently being formed.

3. A method as claimed in claim 2, wherein the height of the residual layer formed on said previous traverse is determined acoustically.

4. A method as claimed in claim 3 wherein the acoustic determination comprises an ultrasonic signal being directed towards the residual layer.

5. A method as claimed in claim 1, wherein the mineral is won by the mining machine making a series of traverses to and fro along a longwall face, the thickness of the residual layer of mineral left by the mining machine on a previous traverse along the face being determined, the thickness of the residual layer currently being left by the machine being deduced by sensing the height of the residual layer formed on said previous traverse relative to the height of the residual layer currently being formed.

6. Apparatus for steering a mining machine in a mineral seam so that the machine follows a desired direction of travel during a current traverse with respect to the boundary of the seam comprising a natural radiation sensor fixedly mounted on the machine and arranged to derive a signal indicative of the thickness of the residual layer of the mineral seam left by the machine on a previous traverse, and means mounted on the machine for comparing the heights of the residual layer formed on a previous and current traverses, respectively, and for deriving signal means indicative of a compared height.

7. Apparatus as claimed in claim 6, wherein the means comprises acoustic means for sensing the height of the residual layer formed on a previous traverse.

8. Apparatus as claimed in claim 7, wherein the acoustic means is adapted to direct an ultrasonic signal towards the residual layer of mineral formed on a previous traverse.

9. Apparatus as claimed in claim 6, wherein the means comprises electrical transducer means adapted to sense the height of the residual layer currently being formed.

10. Apparatus as claimed in claim 9, wherein the cutting means is carried on a rangeable arm, the electrical transducer means being arranged to sense the ranged position of the arm.

11. A method of steering a cutting means of a mineral mining machine relative to a rock boundary of a mineral seam during a mineral winning traverse, comprising moving a mining machine along an armored face conveyor, pivoting a member on the mining machine, rotating a cutter drum on an end of the member remote from the mining machine, sensing thickness of a residual layer of mineral left by the mining machine on a previous traverse by sensing natural radiation from rock above the residual layer through the residual layer of the material, with a radiation sensor fixed by mounting on the mining machine, thereby sensing attenuation of radiation by the thickness of the residual layer, and thereby sensing thickness of the residual layer, sensing the height with respect to the machine of the residual layer left by the mining machine on the previous traverse by an acoustic device fixed on the machine and sensing the height with respect to the machine of the cutting means during the current traverse by a transducer connected to the machine and to the pivoting member, comparing the residual thickness of mineral left by the mining machine on the previous traverse sensed by the radiation sensor, the height of the residual layer sensed by the acoustic device, and the height of the cutting means from the transducer and controlling the height of the cutting means by controlling the pivoting of the arm according to the comparing.

12. The method as claimed in claim 11 wherein the determining further comprises sensing the natural radiation through the residual layer left by the mining machine on the previous traverse and through air between that layer and a sensing device on the mining machine.

13. Apparatus for steering a cutting means of a mineral mining machine relative to a rock boundary of a mineral seam so that the machine follows a desired direction of travel with respect to the boundary of the seam comprising a natural radiation sensor fixedly mounted on the machine and arranged to derive a signal indicative of the thickness of a residual layer of the mineral seam left by the machine, the natural radiation sensor sensing radiation from the rock through the residual layer, and means mounted on the machine for comparing the height of the residual layer left by the machine with the cutting position of the cutter means, and means for deriving a signal indicative of said compared height.

* * * * *